United States Patent [19]

Gueguen et al.

[11] 4,453,681
[45] Jun. 12, 1984

[54] WINDER FOR A SAFETY BELT

[75] Inventors: Daniel Gueguen, Montesson; Jacques Rothéra, St. Michel, both of France

[73] Assignee: Autoliv AB., Vargada, Sweden

[21] Appl. No.: 436,129

[22] Filed: Oct. 22, 1982

[30] Foreign Application Priority Data

Oct. 28, 1981 [FR] France ............... 81 20230

[51] Int. Cl.$^3$ .................. A62B 35/02; B65H 75/48
[52] U.S. Cl. .................. 242/107.4 A; 242/107.4 B
[58] Field of Search ............ 242/107.4 B, 107.4 A, 242/107.4 R, ; 280/806; 297/478, 480

[56] References Cited

U.S. PATENT DOCUMENTS

| 3,291,416 | 12/1966 | Gionta ..................... 242/107 |
| 3,698,657 | 10/1972 | Kirchhoff et al. ........... 242/107.4 B |
| 3,929,300 | 12/1975 | Lindqvist .................. 242/107.4 B |
| 4,101,092 | 7/1978 | Schmelow ................. 242/107.4 A X |
| 4,168,810 | 9/1979 | Sack et al. ................ 242/107.4 B X |
| 4,204,652 | 5/1980 | Cislak et al. .............. 242/107.4 R |

FOREIGN PATENT DOCUMENTS

| 2401671 | 3/1979 | France . |
| 2409767 | 6/1979 | France . |
| 2454310 | 11/1980 | France . |
| 2476491 | 8/1981 | France . |

Primary Examiner—John M. Jillions
Attorney, Agent, or Firm—Sughrue, Mion, Zinn, Macpeak, and Seas

[57] ABSTRACT

A self-locking winder for a safety belt comprising a mandrel (5) rotatively mounted in a support (1) and on which is wound the strap of the belt, the mandrel being biased by a torsion spring (63) in the winding direction, and a locking device (16, 19, 28). The latter locks the mandrel against rotation in the event of impact and prevents the unwinding of the strap. The mandrel comprises a sleeve (6) of moulded plastics material in which is mounted a metal reinforcing bar (9). A reel (11) is mounted on the sleeve and receives the strap. The sleeve is directly journalled in the support.

9 Claims, 11 Drawing Figures

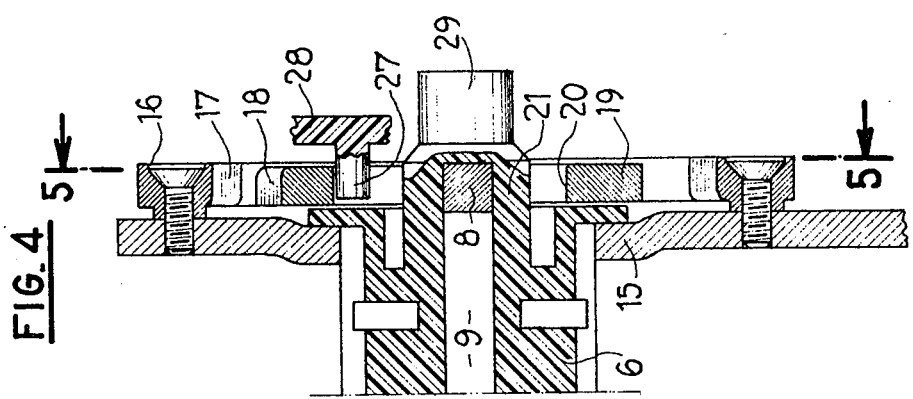
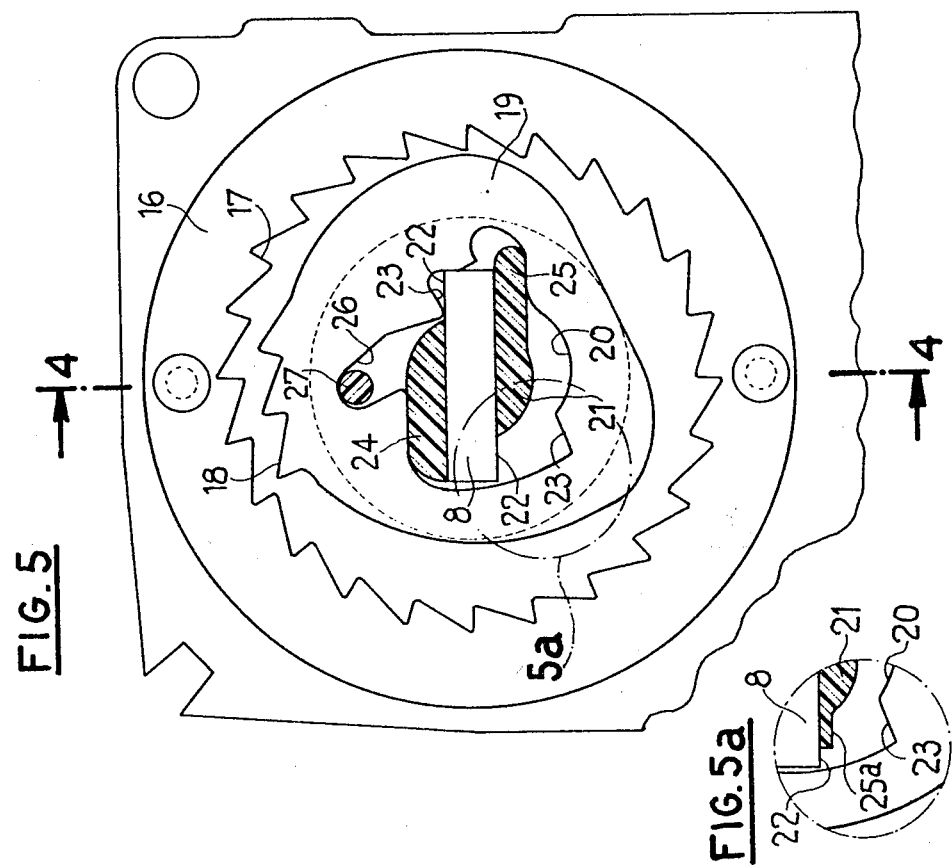

WINDER FOR A SAFETY BELT

DESCRIPTION

The present invention relates to winders for safety belts intended in particular for ground automobile vehicles, sea, air or space craft.

Self-locking winders are known for safety belts which comprise a shaft on which the safety strap is wound and which is biased by a torsion spring in the winding direction, and a locking device which, in the event of impact, locks the shaft against rotation and prevents the unwinding of the strap.

The locking device is often formed by a cam surrounding one end of the shaft of the mandrel and driven by an inertia wheel. The cam has outer teeth which engage with inner teeth on a ratchet wheel fixed to the support of the winder.

Winders constructed heretofore comprise a mandrel for winding the strap and constituted by a massive metal shaft whose end cooperates with the cam and has a complicated profile which increases the cost of manufacture of the winder.

An object of the invention is to overcome the drawback of winders of conventional construction by providing a winder which combines simplicity of construction with effectiveness of operation.

The invention therefore provides a self-locking winder for a safety belt comprising a mandrel rotatively mounted in a support and on which the belt of the safety belt is wound, said mandrel being biased by a torsion spring in the winding direction, and a locking device which, in the event of impact, locks the mandrel against rotation and prevents the unwinding of the safety belt wherein said mandrel comprises a sleeve of moulded plastics material in which is mounted a metal reinforcing bar and on which is mounted a reel for receiving the strap, said sleeve being journalled directly in said support.

Further features of the invention will be apparent from the ensuing description which is given solely by way of example with reference to the accompanying drawings, in which:

FIG. 4 is a partial sectional view of the locking device of the winder according to the invention;

FIG. 5 is a sectional view taken on line 5—5 of FIG. 4, showing the locking device in the position of rest;

FIG. 5a is a sectional view of a detail of FIG. 5 surrounded by a circle in dot-dash line showing a modification of the construction;

Figure 1:
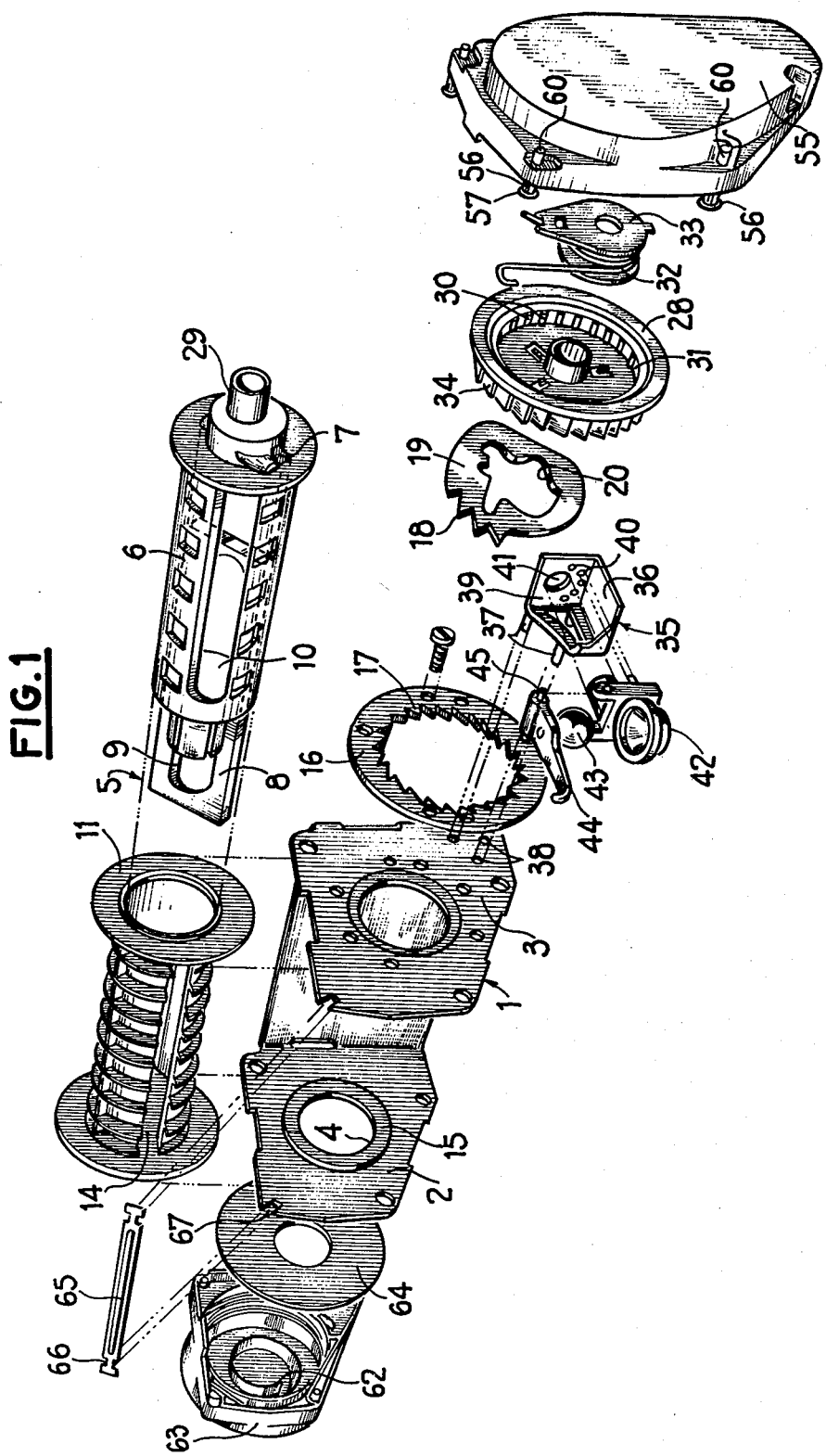
FIG. 1 is an exploded perspective view of the winder for a safety belt according to the invention.

The winder shown in FIG. 1 comprises a metal support 1 in the shape of a fork which includes in its two lateral wings 2 and 3 coaxial circular apertures 4 for receiving the end portions of the shaft of a mandrel designated by the general reference numeral 5, on which mandrel the strap of the winder (not shown) is wound.

The mandrel 5 comprises mainly a shaft 6 in the form of a sleeve made from moulded plastics material and having an axial cavity 7 in which is fitted a flat reinforcing bar 8 which is shown in a position partly engaged in the sleeve in FIG. 1. The bar 8 has an axial opening 9 which coincides, in the mounted position of the bar, with a corresponding opening 10 formed in the sleeve 6 so as to allow the passage of the fixing end portion of the strap.

One of the ends of the shaft 6 comprises means which are part of the locking device of the winder and which will be described in more detail with reference to FIG. 4.

Mounted on the sleeve 6 is a reel 11, for example a reel of the type disclosed in French Pat. No. 2 452 941 belonging to the firm AMCA, the annular body of which is arranged in such manner as to be radially crushed under the effect of the high traction to which the strap of the winder is subjected in the event of impacts, which returns the minimum winding diameter to a value in the neighbourhood of that of the shaft of the winder.

Figure 7:
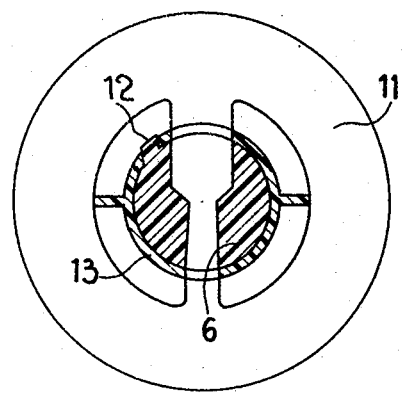
FIG. 7 is a sectional view of the mandrel for winding the strap showing the assembly of the various elements of the mandrel.

As shown in FIG. 7, the reel 11 is keyed on the sleeve 6 to rotate with the latter by means of a pin 12 carried by the sleeve and extending into a corresponding orifice formed in the annular body 13 of said reel.

If will be understood that the reel 11 also has, in its lateral surface, axial passages 14 for the strap.

The axial positioning of the mandrel 5 in the support 1 is achieved by the cooperation of the end surfaces of the mandrel with annular projections 15 surrounding the apertures 4 provided in the wings 2 and 3 of the support and produced by a stamping of the material of the support.

Fixed outside the wing 3 of the support 1 is a ratchet wheel 16 which is coaxial with the aperture 4 for the passage of the shaft 6 of the mandrel. This ratchet wheel has inner teeth 17 adapted to cooperate with a corresponding locking portion defining outer teeth 18 of a cam 19 whose cam profile 20 is defined by a sinuous and closed cut-out opening in the cam which will be better described with reference to FIGS. 4 to 6.

As shown in FIG. 4, the cam 19 is mounted inside the ratchet wheel 16 so as to surround the end portion of the shaft 6 of the reel 5 and of the bar 8.

The ratchet wheel 16 and the cam 19 are produced by stamping or blanking them from sheet material. The direction of the blanking of these two members is reversed so that, upon assembly, the flat of the blanking of one of the members is in facing relation to the round portion of the other.

This arrangement is of particular advantage in respect of the teeth 17 and 18 of the ratchet wheel 16 and the cam 19. Indeed, when the teeth 18 of the cam engage the teeth of the ratchet wheel, the teeth of the two members have a tendency to undergo a relative axial displacement under the action of the radial force. With the aforementioned arrangement, the contacting surfaces of said two sets of teeth have a tendency to increase slightly and this reduces the unit pressure exerted on the two sets of teeth.

At this end adjacent to the ratchet wheel 16, the shaft 6 has a journal 21 whose diameter is smaller than the width of the bar 8. The bar 8 projects out of the lateral surface of the journal and has two bared portions 22 which are adapted to cooperate with diametrically opposed rectilinear portions 23 of the cam profile 20 so as to transmit the force exerted by the strap of the belt from the set of teeth 18 to the set of teeth 17 of the ratchet wheel 16.

Figure 6:
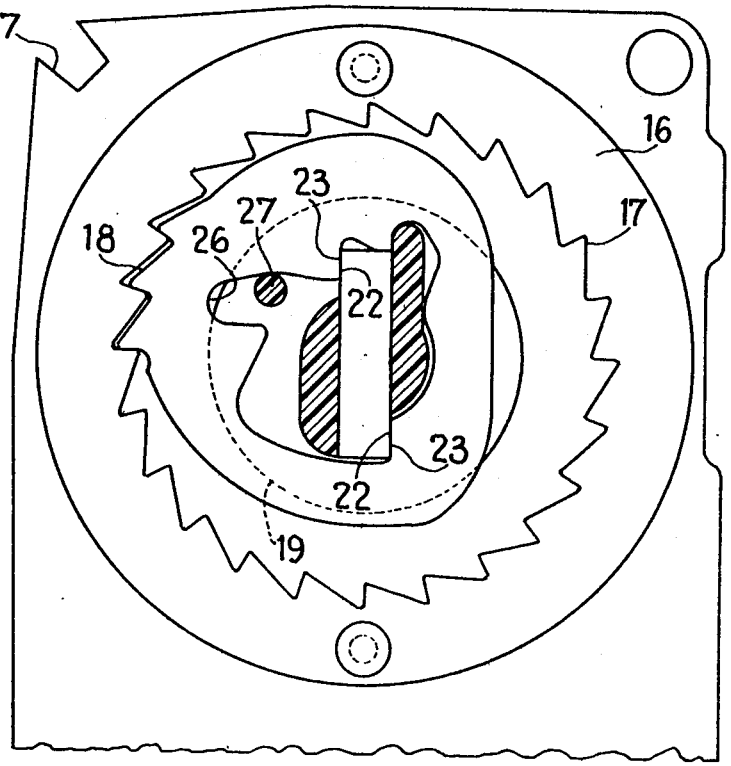
FIG. 6 is a view similar to FIG. 5 showing the locking device in the active position.

FIG. 6 shows the cooperation of the portions 22 of the bar 8 with the corresponding portions 23 having the rectilinear profile. The metal-against-metal contact thus produced enables the assembly to transmit large forces which are produced upon impact resulting in the intervention of the safety belt.

The surfaces of the bar 8 opposed to the bared portions 22 are each provided with beads 24 and 25 which are in one piece with the sleeve 6 and which are adapted to come into contact with corresponding portions of the cam profile 20 when the locking device is in the position of rest. With this arrangement, shown in detail in FIG. 5, noise produced by vibrations is considerably reduced.

By way of a modification, as shown in FIG. 5a, the bead 25 comprises an extension 25a which partly covers the neighbouring bared portion 22. This extension performs the function of an anti-noise element upon the locking of the winder in normal use and a reaction element whose crushing under the action of the bar 8 under conditions of impact accentuates the engagement of the teeth of the cam and ratchet wheel. A similar extension may also be provided on the other bead 24. It is also possible to apply, on each bared portion, a lining element which would perform the same function as the aforementioned extensions.

The camp opening defining the profile 20 has a recess 26 in which is engaged a pin 27 for driving the cam in rotation, said pin being carried by a gear wheel 28 of plastics material rotatively mounted on the end portion 29 of the journal 21 provided in the extension of the sleeve 6. The gear wheel 28, usually termed an inertia wheel, is produced by injection moulding and has a large number of apertures 30 formed in an annular wall 31 and adapted to receive a hook-shaped end portion of a sensitivity spring 32 which is mounted on a hub 33 adapted to be fixed to the end portion 29 of the journal 21 so as to rotate with the latter. The number of apertures 30 provided in the wheel 28 is, for example, seventeen. This wheel permits a fine adjustment of the return force exerted by the spring 32 on the wheel 28. The spring 32 is advantageously a spring wire which has a very small diameter and great length so that its response curve is very flat.

The features of the spring 32 in combination with the many positions of the hooking of its end on the inertia wheel 28, affords a very high precision in the adjustment and a very wide range of utilisation. The variations in the return force exerted by the spring from one position of adjustment of its hook-shaped end portion to the following, are extremely small, which is an important adavantage for the user.

The inertia wheel 28 has outer teeth 34 which cooperate with an acceleration detector generally designated by the reference numeral 35 and which will now be described with reference in particular to FIGS. 2 and 3.

This detector comprises mainly a first case 36 of plastics material which carries on one of its sides pins 37 for fixing the case against the wing 3 of the support 1 by the insertion of said pins in corresponding apertures 38 provided in the support.

In a lateral side 39 perpendicular to the side by which it is fixed to the support 1, the case has a series of positioning orifices 40 spaced apart at given angular distances and placed on a circle which surrounds an aperture of larger diameter 41. Mounted in the case 36 is a second case 42 which constitutes a cradle for an inertia mass 43 constituted in the presently described embodiment by a ball adapted to actuate a lever 44 pivotally mounted on the second case 42 by a pin 45, the free end of this lever cooperating with the outer teeth 34 of the inertia wheel 28.

Figure 2:
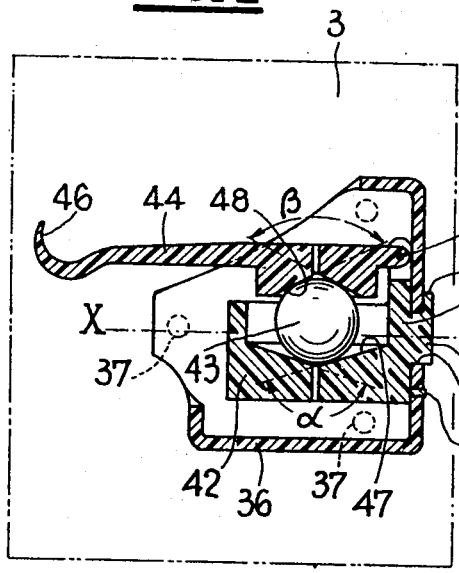
FIG. 2 is a sectional and elevational view of the acceleration detector of the winder according to the invention.

As can be seen in particular in FIG. 2, the second case 42 has a cup 47 of conical shape for receiving the ball 43, and the lever 44 also has a conical cavity 48 which caps the ball 43. The second case 42 further comprises a portion 49 which is perpendicular to the cradle and carries a projection 50 engaged in the orifice 41 of the first case 36 and a lug 51 adapted to be engaged in one of the orifices 40 surrounding the central aperture 41 so as to place the second case in a horizontal position, bearing in mind the inclination which must be given to the support 1 of the winder.

The projection 50 has at its end enlarged portions 52 in the form of tongues of larger size than the diameter of the aperture 41 so as to immobilise the second case 42 by a clipping into this aperture.

Figure 3:
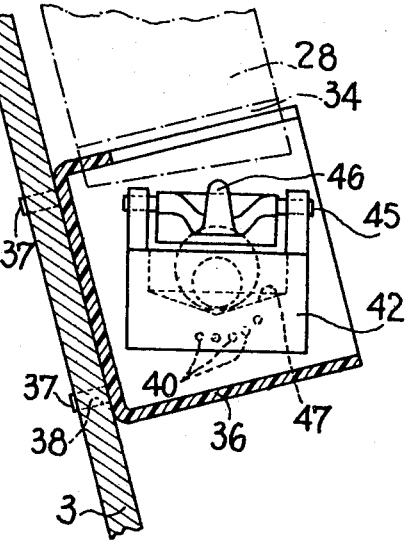
FIG. 3 is a partial sectional view of the detector of FIG. 2 showing means for correcting the attitude of the detector when the winder is mounted in an inclined position.

FIG. 3 shows a certain inclination of the support of the winder, embodied by the inclination of the wing 3 of the winder to which the first case 36 of the acceleration detector is secured. The second case 42 is secured in the first case by choosing for its lug 51 an orifice 40 whose angular deviation from the vertical is such as to return the cup 47 of the case to the horizontal position.

In the embodiment shown in FIGS. 1 to 3, the first case 36 is provided with a series of orifices 40 whereby it is possible to compensate for the attitude of the second case 42 as a function of a plurality of inclinations of the case. However, when it concerns mass-producing winders intended for one particular type of vehicle in respect of which the required inclination of the case of the winder when it is placed in position is known, it is sufficient, when moulding the first case 36, to provide in the wall 39 of the latter only a single orifice 40 corresponding to the envisaged compensation for the attitude.

This manufacture is achieved very simply by providing in the die producing the first case 36 a certain number of inserts each provided with a pin whose position corresponds to the required inclination for forming the corresponding orifice in the case 36.

In this way, the die or mould is rendered of use for producing cases intended for winders having different inclinations.

The acceleration detector just described operates in the following manner. Upon acceleration, the ball 43 is displaced in the conical cup 47 of the case 42 and acts on the conical cup of the lever 44 and this shifts the latter upwardly by pivoting about the pin 45. The nose portion 46 of the lever is thus placed in position for locking the inertia wheel 28 by engagement with the outer set of teeth 34.

The reaction to a given acceleration is determined by the angle $\alpha$ of the conical cup 47.

The distance through which the lever rises is determined by the respective angles α and β of the two cups 47 and 48.

The ball box just described is of utility for all the inclinations between 0° and 30° toward the left or toward the right.

The inclination is determined by the first case 36. It can be seen that, owing to the arrangement shown in FIG. 2, the second case 42 can occupy various angular positions in the first case 36 by rotation about a constant horizontal axis XY irrespective of the inclination of the winder. The clearance between the nose portion 46 of the lever 48 and the inertia wheel 28 is therefore constant.

In order to determine the angle of inclination of a given acceleration detector, the latter can be identified from the exterior of the winder by a different colour of the first case 36 and consequently of the pins 37 fixing the first case to the support 1. The cases provided for mounting with zero angle of inclination could be of yellow colour, those for mounting with an inclination of 8° could be of white colour, etc.

The direction of inclination toward the left or right may be rendered recognizable by providing for one of the three fixing pins 37 a shape different from that of the other two pins. For example, one of the pins could be flat while the others could be hollow or inversely.

In order to render the reaction of the acceleration detector and its sensitivity identical in the four directions, the cup 48 of the lever 44 may have an inclination relative to the cup 47 of the second case. This inclination is embodied by an angular offsetting of the apex of the cup 48 of the lever 44 relative to the vertical through the apex of the cup 47 of the second case 42.

The angular offset is toward the nose portion 46 of the lever 44.

Figure 9:
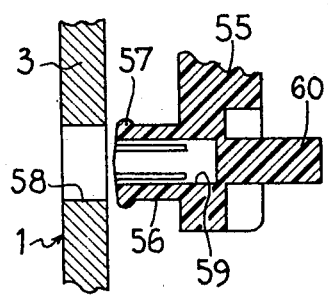
FIGS. 9 and 10 are partial sectional views showing the means for immobilizing the end caps of the winder on the metal support, respectively in a position ready for assembly and in an assembled position.
Figure 10:
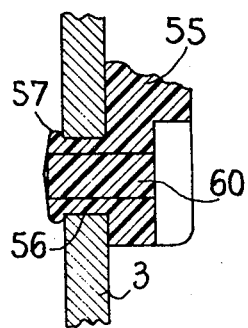

The assembly comprising the ratchet wheel 16, the cam 19, the inertia wheel 28 and the acceleration detector 35 is enclosed by a cap or cover 55 of plastics material which is secured to the wing 3 of the support 1 in the manner shown in FIGS. 9 and 10. The cover 55 has, on the side thereof adapted to be applied against the support 1, split pins 56 provided with radial end projections 57 and adapted to be clipped into corresponding apertures 58 formed in the wing 3 of the support 1. The pins 57 are hollow and the cover has, moulded therewith, in facing relation to the hollow 59 of each pin, a breakable plug 60 which, as shown in FIG. 10, is forced into the hollow 59 of the corresponding pin after the latter has been inserted in its aperture 58. In this way, the cover is locked in position and it is practically impossible to withdraw it without special tooling.

The winder shown in FIG. 1 further comprises a return spring 62 for the mandrel 5 disposed in a second cover 63 adapted to be applied against the wing 2 of the support 1 remote from the locking mechanism, a thin disc 64 being interposed between the spring and the outer surface of the wing 2 of the support and pinched on its periphery by the cover 63. The disc 64 is made from the thin film of plastics material and prevents a metal-to-metal contact between the support 1 and the spring 62. The cover 63 is secured to the wing 2 of the support 1 in the same way as the cover 55.

Figure 8:
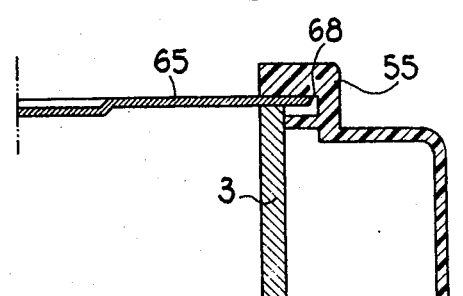
FIG. 8 is a partial sectional view showing the maintenance of the spacer member of the support of the winder by means of the end caps of the winder.

The distance between the wings 2 and 3 of the support 1 of the winder is ensured by means of a thin metal strut 65 which has at each end notched regions 66 engaged in notches 67 provided in the wings 2 and 3. The strut 65 is immobilised by the covers 65 and 63 which have for this purpose, as shown in FIG. 8, recesses 68 for the end portions of the strut located beyond the notches 66 and extending beyond the support 1.

The operation of the winder just described results from its very construction and is essentially remarkable in that the locking device operates, owing to the particular profile of the cam 19 which cooperates with the central bar 8 of the mandrel 5, effectively owing to the metal-to-metal contact between the bar and the regions 23 of the cam for transmitting the large force produced by an impact and to the contact between a plastics material and metal when the device is at rest so that practically all noise due to vibrations is avoided.

The winder just described is simple in construction in that its mandrel is made from moulded plastics material reinforced by a simple metal bar whose end acts as a transmission element cooperating with the cam, the driving of which is controlled by the acceleration detector. Owing to its profile which encompasses the cavity for the crankpin of the inertia wheel 28, the cam has the advantage of only permitting its assembly in a single direction so that possible errors are avoided. Moreover, the cam is simple to stamp out.

The fineness of the return spring 32 of the inertia wheel 28 permits an extremely precise adjustment of the return force exerted by this wheel and a fine adjustment of the inertia of this wheel when it is driven by an acceleration of the strap. The locking of the covers protecting the mechanism of the winder renders its interior practically inaccessible without the use of special tooling.

Consequently, the winder according to the invention combines a relative simplicity of construction with good safety in operation and an enhanced flexibility of adaptation to the requirements of automobile vehicle constructors.

Having now described our invention what we claim as new and desire to secure by Letters Patent is:

1. A self-locking winder for a safety belt for use on a vehicle by an occupant, said winder comprising a support, a mandrel including a sleeve of moulded plastics material, a metal reinforcing bar mounted in the sleeve and a reel mounted on the sleeve for receiving a strap of the safety belt wound on the reel, said sleeve being journalled in said support for mounting the mandrel on said support so that the mandrel is rotatable about an axis relative to the support, a torsion spring associated with the mandrel for biasing the mandrel to rotate in a strap winding direction about said axis, a locking device associated with the mandrel for locking the mandrel against rotation about said axis and preventing the unwinding of the strap in the event of impact on said vehicle, said locking device including means fixed against rotation relative to said support, a cam which defines a locking portion and a cam profile, the reinforcing bar having, at an end thereof, bared portions which project from the material of said sleeve and are cooperative with said cam profile, and means for shifting said cam profile against said bared portions for causing said locking portion of said cam to engage said means fixed against rotation and thereby lock said bar against rotation relative to said support when said mandrel is rotated by unwinding of said strap by the occupant due to an impact on said vehicle.

2. A winder according to claim 1, wherein said means for shifting the cam against said bared portions comprise an inertia wheel and a pin fixed to said inertia wheel and drivingly connecting said inertia wheel to said cam and said means fixed against rotation relative to said support is a ratchet wheel fixed to said support and having inner teeth and said locking portion of said cam defines outer teeth cooperative with said inner teeth, said profile of the cam being a closed sinuous profile which defines an opening and comprises rectilinear portions directly cooperative with said bared portions of the bar which bared portions are disposed in said cam opening, and said cam profile further comprising a recess in which recess is engaged said pin.

3. A winder according to claim 2, wherein said sleeve comprises anti-noise end beads in one piece with the sleeve and respectively contacting ends of surfaces of the bar opposed to said bared portions of the bar and adapted to cooperate with corresponding portions of said cam profile in a position of rest.

4. A winder according to claim 2, wherein the ratchet wheel and the cam are stamped from sheet material with opposite stamping directions so that a flat portion of the stamping of the teeth of the ratchet wheel is in facing relation to a rounded portion produced by the stamping of the teeth of the cam.

5. A winder according to claim 2, wherein said inertia wheel has in a lateral surface thereof a large number of apertures equally spaced angularly apart, and a return spring of wire of very small wire diameter and great length has a first end portion connected to rotate with said sleeve and a second end portion which is engaged in a selected one of said apertures.

6. A winder according to claim 1, wherein said support is in the shape of a fork having two wings in which said sleeve is journalled, and against each of which wings are respectively mounted, in protecting covers, the locking device associated with an acceleration detector and said torsion spring, the covers being secured to the respective wings of the support by hollow split pins which are in one piece with the covers and engaged in corresponding apertures provided in said wings, the pins being immobilised by the insertion in their hollows of a breakable plug which is also in one piece with said covers.

7. A winder according to claim 6, comprising a strut having end portions engaged in maintaining recesses provided in each of said covers for holding the wings of the support in position.

8. A winder according to claim 6, comprising a disc interposed between said torsion spring and the corresponding wing of the support, the disc being formed by a film of plastics material having a peripheral position gripped between said corresponding wing and the cover containing said torsion spring.

9. A winder according to claim 6, wherein the mandrel is positioned in the support by the cooperation of end surfaces of the mandrel with annular projections surrounding apertures in said wings in which apertures said sleeve is journalled.

* * * * *